United States Patent Office 3,479,407
Patented Nov. 18, 1969

3,479,407
SULFURIZATION OF 2,6-DI-TERT-BUTYLPHENOL
Robert J. Laufer, Pittsburgh, Pa., assignor to Consolidation Coal Company, Pittsburgh, Pa., a corporation of Delaware
No Drawing. Continuation-in-part of application Ser. No. 600,744, Dec. 12, 1966. This application Nov. 6, 1968, Ser. No. 773,944
Int. Cl. C07c *149/16, 149/10*
U.S. Cl. 260—608
3 Claims

ABSTRACT OF THE DISCLOSURE

In a process for sulfurizing 2,6-di-t-butylphenol by the use of sulfur monochloride to make 4,4'-dithiobis(2,6-di-t-butylphenol), the improvement which comprises the use of catalytic amounts of iodine.

CROSS REFERENCES

This application is a continuation-in-part of my copending application, Ser. No. 600,744, filed Dec. 12, 1966, now abandoned.

BACKGROUND OF THE INVENTION

Field of the invention

This invention relates to a process for the sulfurization of 2,6-di-t-butylphenol by the use of sulfur monochloride, $S_2Cl_2$, whereby a mixture of sulfides, comprising principally the disulfide, 4,4'-dithiobis(2,6-di-t-butylphenol), is obtained. The product per se is useful as an antioxidant for high molecular weight unsaturated hydrocarbon polymers such as polybutadiene, methyl rubber, natural rubber, butyl rubber, etc. (see U.S. Patent No. 3,250,712). The product may also be used as an intermediate in the preparation of mercaptophenols (see U.S. Patent No. 3,275,694).

Description of the prior art

In an article entitled "The Action of Sulfur Monochloride on Phenols" by Z. S. Ariyan and L. A. Wiles [J. Chem. Soc. 3876 (1962)], the general statement is made that phenols react readily with sulfur monochloride, $S_2Cl_2$, giving mixtures of mono- and poly-sulfides. No mention is made in the experimental section of the article of the use of catalyst. Thus, for some phenols it appears that sulfurization proceeds readily without added catalysts. However, I have found that virtually no reaction between 2,6-di-t-butylphenol and $S_2Cl_2$ takes place on mixing at room temperature. Reaction eventually occurs, but only after about six hours. Even then, after prolonged standing at room temperature, the conversion of 2,6-di-t-butylphenol is only about 75 percent.

SUMMARY OF THE INVENTION

In accordance with the present invention, an improvement in the process of sulfurizing 2,6-di-t-butylphenol by means of $S_2Cl_2$ is provided. The improvement in the process comprises reacting 2,6-di-t-butylphenol with $S_2Cl_2$ in the presence of a catalytic amount of iodine. The amount of iodine is generally between 0.001 to 1 mole, preferably 0.001 to 0.5 mole per mole of 2,6-di-t-butylphenol. The reaction temperature generally is within the range of −50 to +100° C., but preferably is between −50 and 30° C. The reaction may be carried out at atmospheric or higher pressure. The use of a solvent is desirable, although the two reactants are completely miscible in the absence of a solvent. Suitable solvents are those organic solvents which are liquid at the reaction temperature. Examples of suitable solvents are aliphatic or aromatic hydrocarbons and their halogen derivatives such as hexane, carbon tetrachloride, toluene, benzene, chlorobenzene, methanol, diethylether, or glacial acetic acid.

The practice of my improved process results in rapid conversion of the 2,6-di-t-butylphenol. Furthermore, I have found the product to comprise principally the disulfide, 4,4'-dithiobis(2,6-di-t-butylphenol).

DESCRIPTION OF PREFERRED EMBODIMENT

For a better understanding of my invention, its objects and advantages, please refer to the following description of the preferred embodiment of the invention.

The preferred embodiment of the process of this invention may be expressed as follows:

EQUATION 1

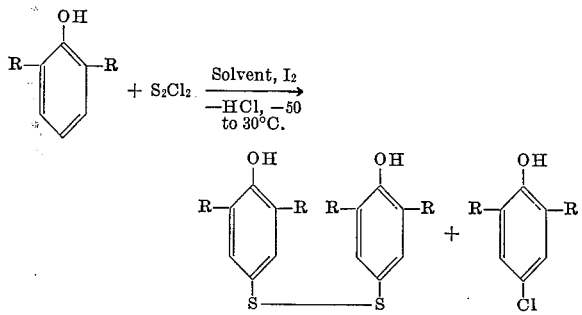

where R is the tertiary butyl group. Some monosulfide and polysulfides are also produced.

*General procedure.*—A 2-liter, 4-necked flask (provided with stirrer, thermometer, dropping funnel, vent to scrubber) is charged with 2,6-di-t-butylphenol, dry solvent and a catalytic amount of iodine. The stirred solution is maintained at the selected temperature until the reaction is completed. Sulfur monochloride is slowly added from the dropping funnel. The reaction begins after an initiation period and is accompanied by a rise in temperature and evolution of hydrogen chloride. The initiation period is the period before the reaction starts; it depends on the temperature and amount of catalyst. It decreases with an elevation in temperature or an increase in catalyst concentration. The rise in temperature depends on the amount of solvent and the heat capacity of the system. The rate of addition of $S_2Cl_2$ is determined by the cooling efficiency of the reactor and the ability to maintain the reaction temperature. The mixture is then held at the reaction temperature for an additional period after $S_2Cl_2$ addition is complete. The product is a clear, dark solution which may be used directly in the well-known manner as a rubber reclaiming agent if the solvent is a suitable solvent for such use, or the solvent may be removed by fractional distillation before such use.

The product comprises principally the disulfide shown in the above reaction equation. The exact amount may be determined by reduction of the product mixture with zinc and hydrochloric acid as follows:

Any dissolved hydrogen chloride is preferably first removed from the sulfurized product, for example by water-washing the solution. The reduction may be carried out in the same vessel without transfer of the sulfurization product. Zinc dust is added to the dry acid-free solution of sulfurization product. The slurry is stirred while being treated with aqueous HCl. The well-agitated mixture (a smooth grey slurry initially) is then heated to 70° for two hours. At the end of this period, some zinc should be left and the oil phase should be colorless. Stirring is halted and the lower aqueous phase is drained. The oil phase is then contacted successively with two portions of hot water. The following products are recovered from the solution by fractional distillation: 2,6-di-t-butyl-4-mercaptophenol, 2,6-di-t-butyl-4-chlorophenol, 2,6-di-*t*- butylphenol and nonvolatiles. The amount of 2,6-d-t-butyl-4-mercaptophenol thus recovered is a measure of the amount of the disulfide formed in the sulfurization reaction, according to the following equation:

EQUATION 2

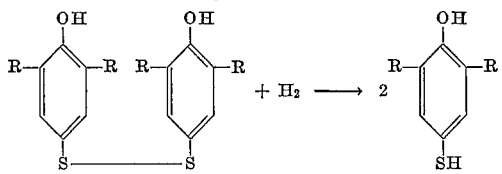

where R is the tertiary butyl group.

*Experimental results.*—The following table summarizes the pertinent data for several runs. For convenience, the compound 2,6-di-t-butylphenol is referred to as "2,6-," and the desired product, 4,4'-dithiobis(2,6-di-t-butylphenol), is referred to as "Disulfide." The caption "Initiation Period" means the period of time before the reaction starts as evidenced by HCl evolution; the caption "Addition Time" means the period of time during which the $S_2Cl_2$ was added; and the caption "Reaction Time" is the period of time after the addition of $S_2Cl_2$ that is required for completion of reaction as evidenced by cessation of HCl evolution. "Conversion of 2,6-" was determined from the amount of 2,6- recovered in the reduction step. The "Yield of Disulfide" is based upon the amount of converted 2,6-.

The reaction product was then subjected to hydrogenation as follows. A zinc-toluene-water slurry was prepared by first mixing 75 grams of zinc and 50 milliliters of toluene, and then adding 200 milliliters of water. The sulfurization reaction product was added to the zinc-toluene-water slurry. Two hundred (200) milliliters of 12 N HCl were added to the stirred mixture of sulfurization reaction product and slurry. Hydrogen sulfide was evolved. The resulting mixture was refluxed until all the zinc was gone. Seventy-five (75) grams of zinc, wetted with toluene, were added and then 300 milliliters of 6 N HCl. Refluxing was continued until no more $H_2S$ evolved. Some zinc was left. Stirring was stopped and the lower aqueous phase was drained. The oil phase was then washed with water. By distillation, the following was determined. The conversion of 2,6-di-t-butylphenol, based on recovered 2,6-di-t-butylphenol was 99.2%. The yield of 2,6-di-t-butyl-4-mercaptophenol was 74.2% of converted 2,6-di-t-butylphenol. The yield of 2,6-di-t-butyl-4-chlorophenol was 18.5%; and the yield of monosulfide product was 4.8%.

It is quite apparent from the results obtained that the use of iodine as a catalyst has a significant effect. In contrast to such results, I have found that the presence of iodine has little or no effect upon the reaction of $S_2Cl_2$ with other phenols than 2,6-di-t-butylphenol. The following Table II tabulates the results obtained by reacting $S_2Cl_2$ with 2,6-dimethylphenol and with 2,4-di-t-butyl-

TABLE I

| Run No. | Moles $S_2Cl_2$/Mole 2,6- | Solvent | Moles $I_2$/Mole 2,6- | Temp., °C. | Initiation Period | Addition Time | Reaction Time, hrs. | Conversion of 2,6-, percent | Yield of Disulfide |
|---|---|---|---|---|---|---|---|---|---|
| 1 | 0.5 | Toluene | 0.002 | −7 to 0 | 7 min | 36 min | 2.5 | 99.2 | 74.2 |
| 2 | 0.5 | do | 0.002 | −6 to −3 | 16 min | 126 min | 1.5 | 98.3 | 78.6 |
| 3 | 0.5 | do | 0.002 | −29 to −14 | 32 min | 32 min | 6.5 | 93.4 | 93.0 |
| 4 | 0.5 | Benzene | 0.10 | −5 to −1 | 3 min | 20 min | 0.5 | 94.4 | 83.2 |
| 5 | 0.5 | Diethylether | 0.002 | −7 to 1 | <26 min | 42 min | 1.8 | 90.6 | 73.6 |
| 6 | 0.5 | Glacial Acetic Acid | 0.002 | 20 to 25 | 9 min | 39 min | 1.4 | 86.4 | 76.8 |
| 7 | 0.5 | Methanol | 0.002 | 18 to 24 | 2 min | 72 min | 2.0 | 73.0 | 71.0 |
| 8 | 0.5 | Benzene | 0 | 22 to 37 | 25 hrs | 22 min | 23.0 | 74.3 | 24.9 |
| 9 | 0.5 | Toluene | 0 | −10 | 6 hrs | Approx. 5-10 sec | 22.0 | 89.8 | 91.0 |

*Run No. 1.*—The details of Run No. 1 are presented below as illustrative of all the runs. The reaction flask phenol, respectively, in the presence of and in the absence of iodine.

TABLE II

| Run No. | Phenol | Moles $S_2Cl_2$/Mole Phenol | Solvent | Moles Iodine/Mole Phenol | Temp., °C. | Initiation Period, min. | Addition Time, min. | Reaction Time, hr. | Conversion of Phenol | Yield of Disulfide |
|---|---|---|---|---|---|---|---|---|---|---|
| 1 | 2,6-dimethylphenol | 0.5 | Benzene | None | −5 to −1 | 4 | 45 | 1.5 | 95.6 | 42.1 |
| 2 | do | 0.5 | do | 0.002 | −5 to −1 | 3 | 60 | 1.3 | 96.1 | 39.4 |
| 3 | 2,4-di-t-butylphenol | 0.5 | do | None | 22 to 29 | 5 | 72 | 1.5 | 94.7 | 55.3 |
| 4 | do | 0.5 | do | 0.10 | 25 to 32 | 2 | 60 | 1.2 | 97.9 | 56.1 | was charged with 206 grams of 2,6-di-t-butylphenol, 200 milliliters of toluene and 0.5 gram of iodine. The temperature of the mixture was reduced to −15° C. by means of a Dry Ice-acetone bath. Seventy-nine (79) grams of $S_2Cl_2$ were added as follows:

| Time | Temp. (°C.) | Ml. of $S_2Cl_2$ Added | Comments |
|---|---|---|---|
| 10:22 | −15 | 0 | Start addition of $S_2Cl_2$. |
| 10:29 | −13 | | Evolution of HCl begins. |
| 10:32 | −4 | 16 | HCl evolution rapid; addition of $S_2Cl_2$ stopped. |
| 10:33 | −3 | 16 | HCl evolution still rapid; start $S_2Cl_2$ addition again. |
| 10:35 | −4.5 | 18 | HCl slowing down. |
| 10:38 | −5 | 21 | HCl steady. |
| 10:50 | −5 | 35 | Do. |
| 10:58 | −4.5 | 48 | All $S_2Cl_2$ added; HCl slowing down. |
| 11:00 | −4 | | HCl slow. |
| 11:08 | −4.5 | | HCl very slow. |
| 12:05 | −5 | | Do. |
| 12:56 | −3 | | Do. |
| 1:27 | 0 | | HCl stopped. |

According to the provisions of the patent statutes, I have explained the principle, preferred construction, and mode of operation of my invention and have illustrated and described what I now consider to represent its best embodiment. However, I desire to have it understood that, the invention may be practiced otherwise than as specifically illustrated and described.

I claim:

1. In a process for making 4,4'-dithiobis(2,6-di-t-butylphenol) by the sulfurization of 2,6-di-t-butylphenol with sulfur monochloride ($S_2Cl_2$), the improvement which comprises conducting the reaction of sulfur monochloride and 2,6-di-t-butylphenol in the presence of a catalytic amount of iodine.

2. The process according to claim 1 wherein said reaction is conducted in an organic solvent at a temperature between −50 and 30° C.

3. The process according to claim 2 wherein said solvent is toluene.

References Cited

UNITED STATES PATENTS 2,810,765  10/1957  Neuworth et al. _____ 260—609

CHARLES B. PARKER, Primary Examiner

D. R. PHILLIPS, Assistant Examiner

U.S. Cl. X.R.

260—137, 609, 623, 624